Nov. 12, 1946.  J. C. CAROTHERS  2,411,081
FREEZING AND CARBONATING DEVICE
Filed Dec. 2, 1943  3 Sheets-Sheet 1

Inventor
JEAN C. CAROTHERS

By Clarence A. O'Brien
and Harvey B. Jacobson
Attorneys

Nov. 12, 1946.           J. C. CAROTHERS                2,411,081
              FREEZING AND CARBONATING DEVICE
                 Filed Dec. 2, 1943         3 Sheets-Sheet 3

Inventor
JEAN C. CAROTHERS

By Clarence A. O'Brien
and Harvey B. Jacobson
Attorneys

Patented Nov. 12, 1946

2,411,081

UNITED STATES PATENT OFFICE 2,411,081

FREEZING AND CARBONATING DEVICE

Jean C. Carothers, Sidney, Ohio

Application December 2, 1943, Serial No. 512,642

4 Claims. (Cl. 62—114)

The present invention relates to new and useful improvements in freezing and carbonating machines, and has for its primary object to provide, in a manner as hereinafter set forth, a device of this character in the form of a single unit comprising a novel construction, combination and arrangement for making ice cream, sherbets, et cetera, and for carbonating water.

Other objects of the invention are to provide a combination freezing and carbonating unit of the aforementioned character which will be comparatively simple in construction, strong, durable, highly efficient and reliable in operation, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
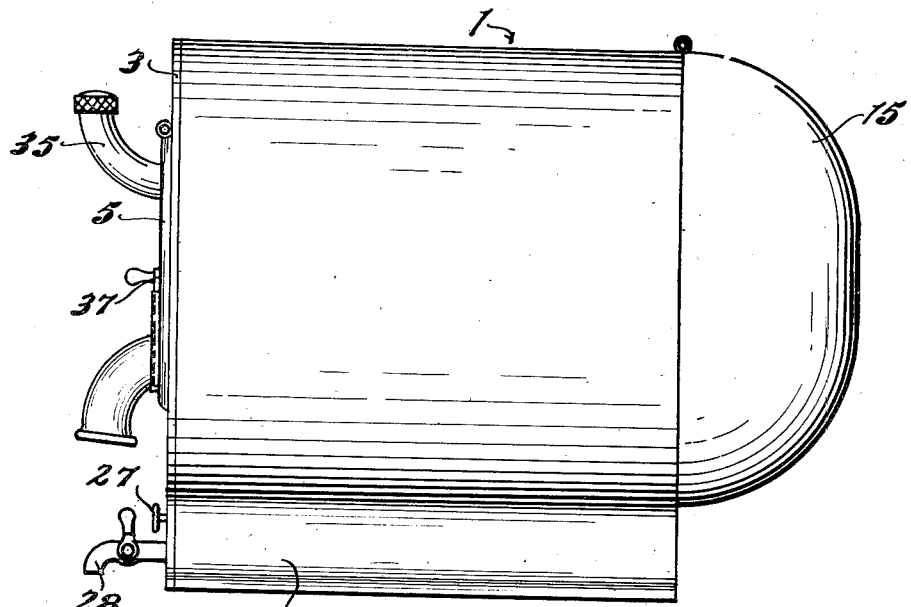
Figure 1 is a view in side elevation of an embodiment of the device.
Figure 2:
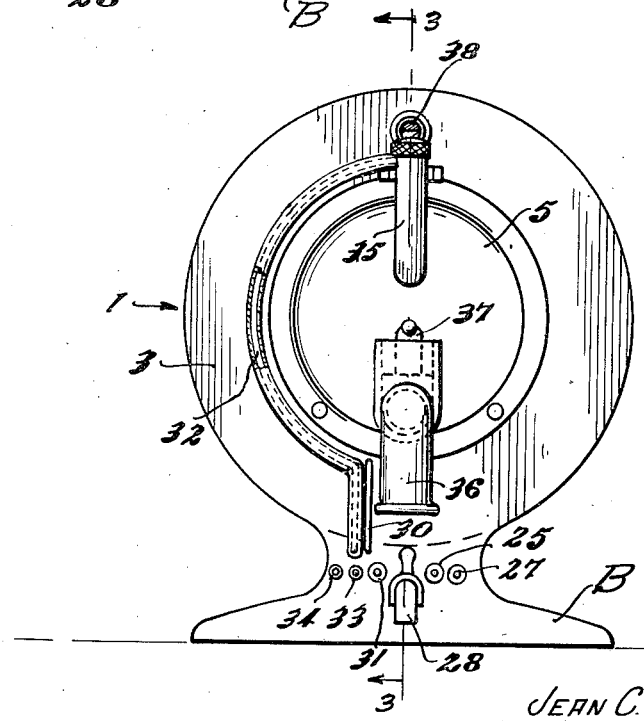
Figure 2 is a view in front elevation thereof.
Figure 3:
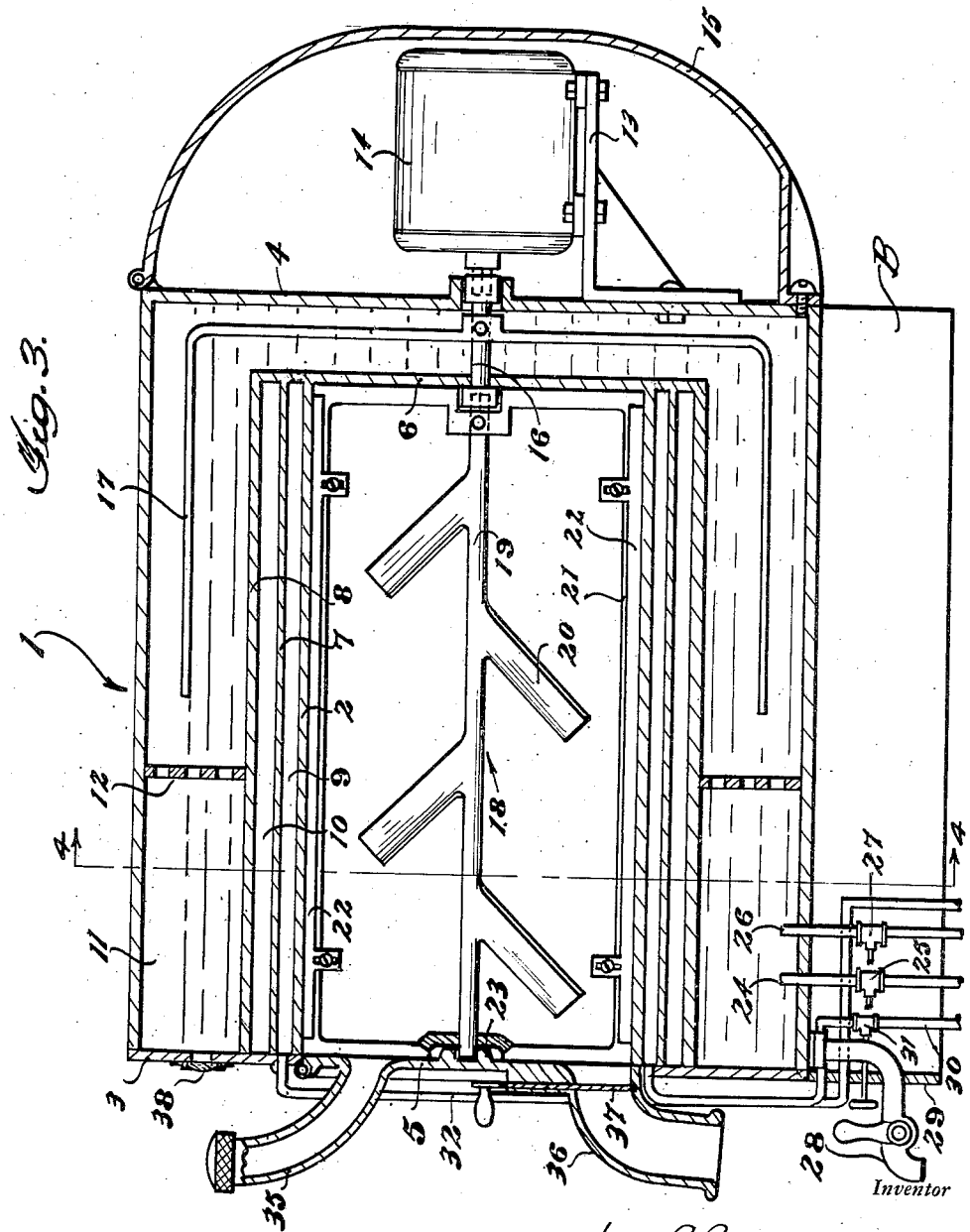
Figure 3 is a longitudinal sectional view, taken substantially on the line 3—3 of Figure 2.
Figure 4:
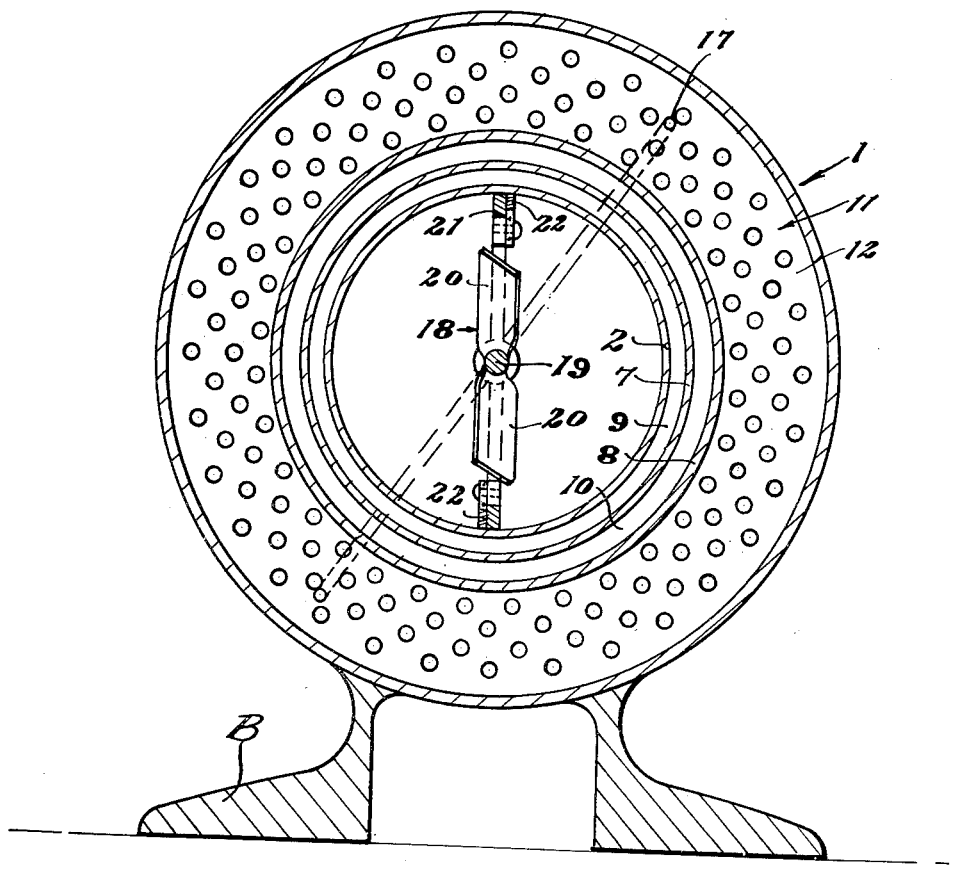
Figure 4 is a cross sectional view, taken substantially on the line 4—4 of Figure 3.

Referring now to the drawings in detail, it will be seen that the embodiment of the invention which has been illustrated comprises a substantially cylindrical shell 1 of suitable dimensions and material. The shell 1 is mounted horizontally on a base B. Mounted longitudinally in the shell 1 in spaced, concentric relation to the cylindrical wall of said shell is a cylindrical freezing chamber 2. The freezing chamber 2 extends from the front 3 of the shell 1 to a point in spaced relation to the rear end 4 of said shell. The front 3 of the shell 1 has formed therein a circular opening which communicates with the chamber 2. A closure 5 is provided for the forward end of the chamber 2. The chamber 2 further includes a closed rear end 6.

The chamber 2 also comprises spaced, concentric intermediate and outer walls 7 and 8, respectively. The chamber 2 and the wall 7 provide a chamber 9 for the reception of a suitable freezing gas. The walls 7 and 8 provide a dead air space or chamber 10.

The space between the freezing unit and the shell 1 constitutes a carbonating chamber 11. The dead air space 10 prevents the water in the carbonating chamber 11 from being frozen by the gas in the chamber 9. This constitutes an important and desirable feature of the invention. A flat, perforated ring 12, which encircles the wall 8, supports the freezing chamber 2 at an intermediate point in the shell 1.

Mounted on a bracket 13 on the rear end 4 of the shell 1 is an electric motor 14. A substantially dome-shaped cover 15 is provided for the motor 14. The motor 14 drives a shaft 16 which is journaled between the rear ends 4 and 6 of the shell 1 and the freezing chamber 2, respectively. Mounted on the shaft 16 is an agitator 17 for the water and gas in the carbonating chamber 11.

A removable dasher 18 is operable in the freezing chamber 2. The dasher 18 includes a longitudinal shaft 19 which is detachably connected to the shaft 16 for actuation thereby. Projecting diagonally from the shaft 19 at longitudinally spaced points are oppositely pitched blades 20. Also mounted on the shaft 19 is a frame 21. Scrapers 22 are adjustably mounted on the frame 21 for operation on the walls of the chamber 2. A suitable bearing 23 is provided on the closure 5 for the forward end portion of the shaft 19.

A water line 24 from a suitable source of supply is connected to the chamber 11, said water line being provided with a hand valve 25. Also connected to the chamber 11 is a carbonating gas line 26 which is provided with a valve 27. A discharge faucet 28 is connected to the lower, front portion of the chamber 11 and extends through the front 29 of the base B. A gas line 30 from a suitable refrigerating machine is connected to the chamber 9 through the front 3 of the shell 1 below the closure 5. A control valve 31 is provided for the line 30. A return line 32 for the freezing gas is connected to the chamber 9 through the front 3 of the shell 1 at a point above the closure 5. A cover may be provided for the freezing gas return line 32 on the front of the shell 1.

The valves 31, 25 and 27 are operable from the front 29 of the base B. Also mounted on the front 29 of the base B is a control switch 33 for the electric motor 14, and a control switch 34 for the aforementioned refrigerating machine.

A filler neck 35 is provided on the closure 5 for the freezing chamber 2. Also, a discharge spout 36 is provided on the closure 5 for the chamber 2. A suitable valve 37 controls the discharge spout 36.

It is thought that the operation of the unit will be readily apparent from a consideration of the foregoing. Briefly, the water and carbonating gas enter the chamber 11 through the valve-controlled lines 24 and 26. The water and gas are thoroughly mixed by the rotating agitator 17. A sight glass 38 is provided for the chamber 11 in the upper portion of the front 3 of the shell 1. The carbonated water which is made in the chamber 11 is dispensed therefrom through the medium of the faucet 28. The ice cream mix or other liquid to be frozen is poured into the chamber 2 through the neck 35. With the motor 14 in operation, the dasher 18 is driven thereby at the desired speed. This may be accomplished through the medium of a suitable gear reduction unit. As hereinbefore stated, the dead air space 10 prevents freezing of the water in the carbonating chamber 11 by the gas in the chamber 9. The freezing gas from a refrigerating machine enters the chamber 9 through the line 30 and returns to said refrigerating machine through the line 32. Access may be readily had to the freezing chamber 2 for cleaning same or for any other purpose by simply opening the closure 5.

It is believed that the many advantages of a combination freezing and carbonating unit constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. In combination, a freezing and carbonating unit comprising a shell, a freezing chamber in the shell spaced from the peripheral wall thereof, means including said shell and said freezing chamber forming a carbonating chamber therein, a dasher operable in the freezing chamber, an agitator operable in the carbonating chamber, and common means for actuating said dasher and said agitator.

2. A freezing and carbonating unit of the character described comprising concentric freezing and carbonating chambers, a dasher operable in the freezing chamber, an agitator operable in the carbonating chamber, and common means for actuating the dasher and the agitator.

3. A freezing and carbonating unit comprising a cylindrical shell, a cylindrical freezing chamber mounted in the shell in spaced, concentric relation thereto, said freezing chamber including spaced, concentric inner, intermediate and outer walls, means including said inner and intermediate walls defining a chamber for the reception of a freezing medium, means including said intermediate and outer walls defining a dead air space between the freezing medium chamber and the carbonating chamber, means including said outer wall and shell defining a carbonating chamber, a dasher operable in the freezing chamber, an agitator operable in the carbonating chamber, and common means for actuating the dasher and the agitator.

4. A freezing and carbonating unit comprising a cylindrical horizontal shell, a motor mounted on one end of said shell, a cylindrical freezing chamber mounted longitudinally in the shell in spaced, concentric relation thereto, the other end of the shell having an opening therein communicating with the freezing chamber, a closure for the opening, one end of the freezing chamber being closed and being spaced from said one end of the shell, means including said freezing chamber defining a carbonating chamber in the shell, a shaft journaled at one end in the closed end of the freezing chamber and at its other end in said one end of the shell and operatively connected to the motor, an agitator mounted on said shaft and operable in the carbonating chamber, and a dasher operable in the freezing chamber and operatively connected to the shaft.

JEAN C. CAROTHERS.